(12) United States Patent
Billings et al.

(10) Patent No.: US 6,470,944 B1
(45) Date of Patent: Oct. 29, 2002

(54) WOVEN ENDLESS AND NEEDLEPUNCHED CORRUGATOR SINGLE FACER BELT

(75) Inventors: Alan L. Billings, Clifton Park, NY (US); Bernard Lantiegne, Averill Park, NY (US)

(73) Assignee: Albany International Corp., Albany, NY (US)

( * ) Notice: Subject to any disclaimer, the term of this patent is extended or adjusted under 35 U.S.C. 154(b) by 0 days.

(21) Appl. No.: 09/421,741

(22) Filed: Oct. 20, 1999

(51) Int. Cl.[7] .............................. B32B 27/04; D03D 3/04
(52) U.S. Cl. ...................... 156/462; 442/271; 442/281; 442/275; 162/904
(58) Field of Search .............................. 162/206, 306, 162/358.2, 358.4, 900, 901, 902, 904; 139/383 A, 383 AA, 425; 428/98, 221; 442/59, 181, 327, 270, 271, 275, 281; 34/111, 116, 123; 156/205, 210, 462

(56) References Cited

U.S. PATENT DOCUMENTS

| | | | |
|---|---|---|---|
| 4,070,519 A | * | 1/1978 | Lefkowitz et al. ........... 442/190 |
| 4,467,839 A | * | 8/1984 | Westhead ................ 139/383 A |
| 4,529,643 A | * | 7/1985 | Lundstrom ................ 442/275 |
| 4,571,359 A | * | 2/1986 | Dutt ............................ 442/324 |
| 4,675,229 A | * | 6/1987 | Westhead ................. 428/316.6 |
| 4,701,368 A | * | 10/1987 | Kiuchi et al. ............... 442/226 |
| RE33,023 E | * | 8/1989 | Hiers ........................... 442/388 |
| 5,298,124 A | * | 3/1994 | Eklund et al. .............. 162/306 |
| 5,316,833 A | | 5/1994 | Davis et al. |
| 5,840,635 A | * | 11/1998 | Bertotto ...................... 442/270 |
| 6,027,615 A | * | 2/2000 | Davenport et al. ....... 162/358.2 |

FOREIGN PATENT DOCUMENTS

| | | |
|---|---|---|
| EP | 0 630 739 A1 | 12/1994 |
| TW | 81109107 | 11/1992 |
| TW | 216447 (8119107) | 11/1993 |

\* cited by examiner

*Primary Examiner*—Peter Chin
*Assistant Examiner*—Eric Hug
(74) *Attorney, Agent, or Firm*—Frommer Lawrence & Haug; Ronald R. Santucci

(57) ABSTRACT

An unlaminated belt for a single-facer section of a corrugated board production line has a single base structure in the form of an endless loop lacking a seam. The base structure is made up of yarns oriented in the machine, or running, and cross-machine directions of the belt. At least one layer of staple fiber material is needled into the outside of the base structure, extends at least partly therethrough, and forms a layer on the outside of the base structure. The base structure, once so needled, is impregnated with a polymeric resin material. The yarns of the base structure, the staple fiber material and the polymeric resin material are all of high-temperature-resistant materials to enable the belt to withstand the conditions under which it must operate on a corrugator machine.

19 Claims, 2 Drawing Sheets

WOVEN ENDLESS AND NEEDLEPUNCHED CORRUGATOR SINGLE FACER BELT

BACKGROUND OF THE INVENTION

1. Field of the Invention

The present invention relates to corrugated paper board manufacture and to the belts required by the machines used to manufacture that variety of paper board. More specifically, the present invention relates to the belts that may be used on the single-facer section of a corrugated board production line.

2. Description of the Prior Art

In the manufacture of corrugated paper board, a so-called core paper is heated by steam, which makes it more pliable, and is then fed into a nip formed between a pair of toothed rollers whose teeth mesh, thereby corrugating the core paper in a uniform, undulating pattern. Starch paste is subsequently applied to the crests of the corrugated core paper, which is then mated to a liner paper in a press nip. There, the corrugated core paper and liner paper are bonded together to form a completed sheet, which can then be further processed as desired.

In one machine used for this purpose in the prior art, the press nip is formed by one of the toothed or corrugating rolls and a pressure roll. In another machine of a more recent design, the press nip is extended in the running direction through the use of a press belt instead of a pressure roll. The press belt holds the corrugated core paper and liner paper together against the corrugating roll for a significant portion of its circumference.

The press belt experiences severe operating conditions. Because heat is used to vaporize moisture in the core paper, the belt operates in a high-temperature environment. Further, the belt continually runs against the teeth on the corrugating roll to develop the required bonding pressure between the core paper and the liner paper. Moreover, the belt must be flexible yet have lengthwise strength and widthwise rigidity sufficient to withstand wrinkling, which may cause the belt to drift undesirably from side to side.

Steel belts, that is, belts woven from steel wire, have been proposed for use on this kind of machine. Steel belts are strong and rigid, but are prone to flex fatigue. Moreover, steel belts cannot be woven endless and must be seamed into endless form, the seam being a weak point in the endless belt. Were such a belt to fail, injury to personnel and damage to equipment may result.

European Publication No. 0 630 739 A1 shows a belt intended for use in place of a steel belt on a belted single-facer machine. The belt is endless, and has an inside surface, an outside surface, a length (L) and a width (W). The belt has an endless woven inner layer, an elastomer layer outside of the endlessly woven inner layer, a canvas outer layer that is expansible lengthwise of the belt outside of the elastomer layer, and a coating on the canvas outer layer. The coating is exposed on the outside surface of the endless belt and resists the bonding of foreign material thereto. The canvas outer layer is not endless, but includes two or more sections joined to one another with overlapped seams.

Experience has shown that the belt disclosed in this publication performs poorly in the environment of the machine. The belt is a composite structure which includes an endless inner fabric layer and a canvas outer layer. The two layers have different stress-strain behaviors under tension. In use, the belt is placed under very high operating tensions in excess of 200 pli (pounds per linear inch). As the belt travels around a closed loop and as the individual fabrics are tensioned simultaneously but occupy different path lengths, delamination becomes likely. Moreover, the belt is very rigid, stiff and incompressible, making it difficult to track and guide in operation.

The present invention provides a solution to the problems inherent in the use of a belt of the foregoing variety.

SUMMARY OF THE INVENTION

Accordingly, the present invention is an improvement for a single-facer section of a corrugated board production line of the foregoing type in the form of an unlaminated single-facer belt.

The unlaminated single-facer belt has a single base structure in the form of an endless loop lacking a seam and having an inside and an outside, a machine, or running, direction and a cross-machine direction. The base structure is formed by machine-direction and cross-machine-direction yarns, and is either woven from these yarns or is a nonwoven structure assembled from them.

At least one layer of staple fiber material is needled into the outside of the base structure and extends at least partly therethrough.

Finally, the base structure and staple fiber material are impregnated with a polymeric resin material.

The yarns of the base structure, the staple fiber material and the polymeric resin material are all of high-temperature-resistant materials.

The present invention will now be described in more complete detail with appropriate reference being made to the figures identified below.

DETAILED DESCRIPTION OF THE PREFERRED EMBODIMENTS

Figure 1:
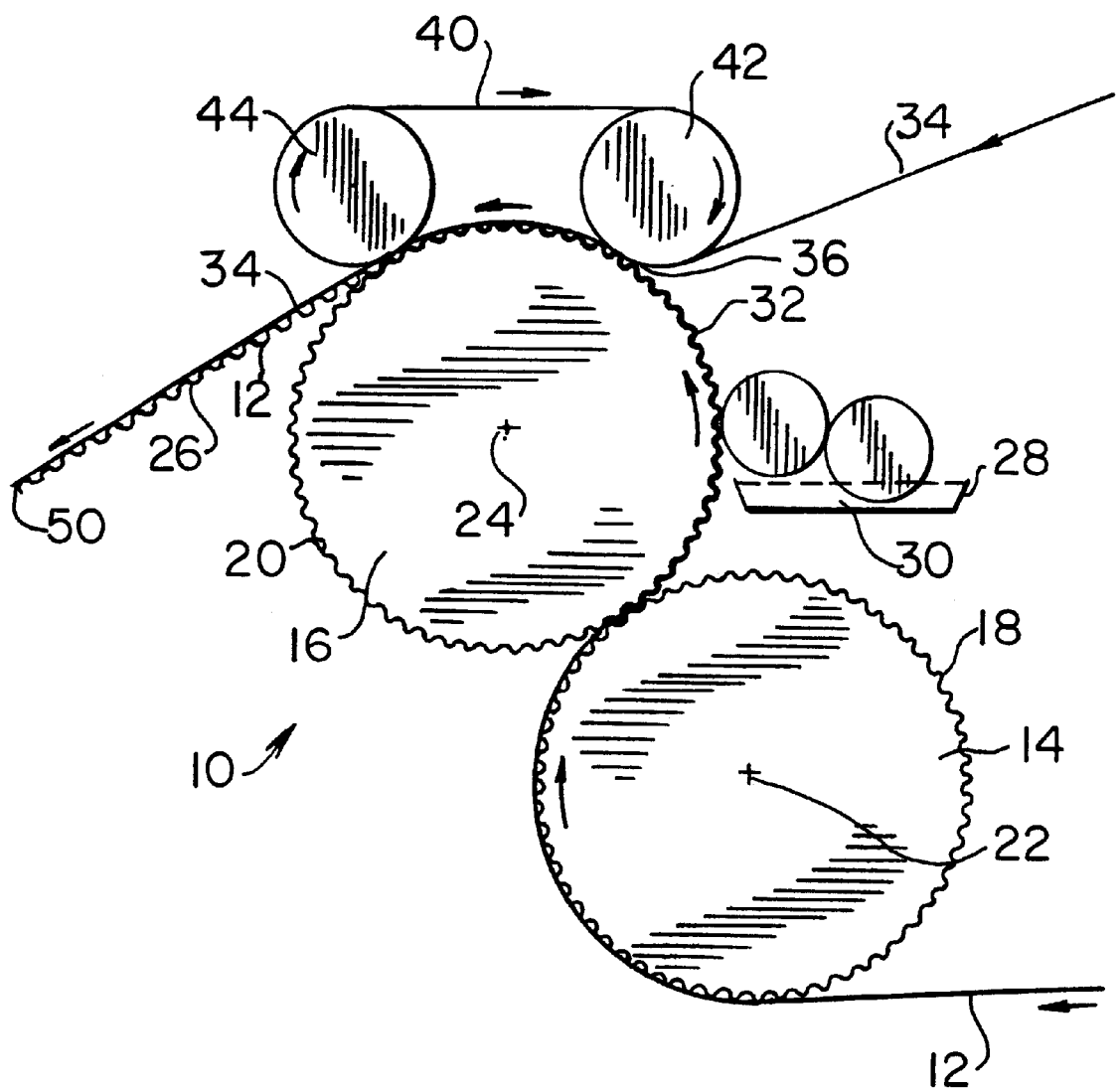
FIG. 1 is a schematic view of a contemporary single-facer section of a corrugated board production line.

Turning now to these figures, FIG. 1 is a schematic view of a typical belted single-facer section 10 of a corrugated board production line. A core paper 12, previously exposed to steam which makes it more pliable, is fed continuously between a pair of cooperating rolls 14,16. The rolls 14,16 have uniformly spaced, peripheral teeth 18,20, which mesh as the rolls 14,16 rotate about their respective, parallel axes 22,24. The meshing teeth 18,20 produce corrugations 26 in the core paper 12.

A coating mechanism 28 applies a starch paste 30 to the crests 32 of the corrugations 26 in the core paper 12.

The corrugated core paper 12 is continuously applied to a liner paper 34 at point 36, where a belt 40, which is trained around a pair of spaced rollers 42,44, passes around roller 42. The spaced rollers 42,44 are so disposed that belt 40 bears against roll 16, and may both form nips with roll 16, so that the belt 40, trained thereabout, bears against roll 16 for the entire interval between spaced rollers 42,44 forming an extended nip between roll 16 and belt 40. Heat is applied to the corrugated core paper 12 and liner paper 34 through at least one of the rollers 42,44, belt 40 and roll 16. The heat vaporizes water absorbed by the corrugated core paper 12 when the corrugated core paper 12 was exposed to steam and dries the starch paste 30.

The rollers 42,44 are situated so that the teeth 20 on roll 16 bear against the outside surface of the belt 40 over a substantial circumferential extent as the system operates. The teeth 20 maintain the proper registration of the corrugated core paper 12 as it is advanced. At the same time, the roll 16 firmly presses the side of the core paper 12 with the paste thereon against the liner paper 34 to effect bonding therebetween. The corrugated core paper 12 with the liner paper 34 attached thereto exits as a completed product 50 from between the roll 16 and the roller 44.

Figure 2:
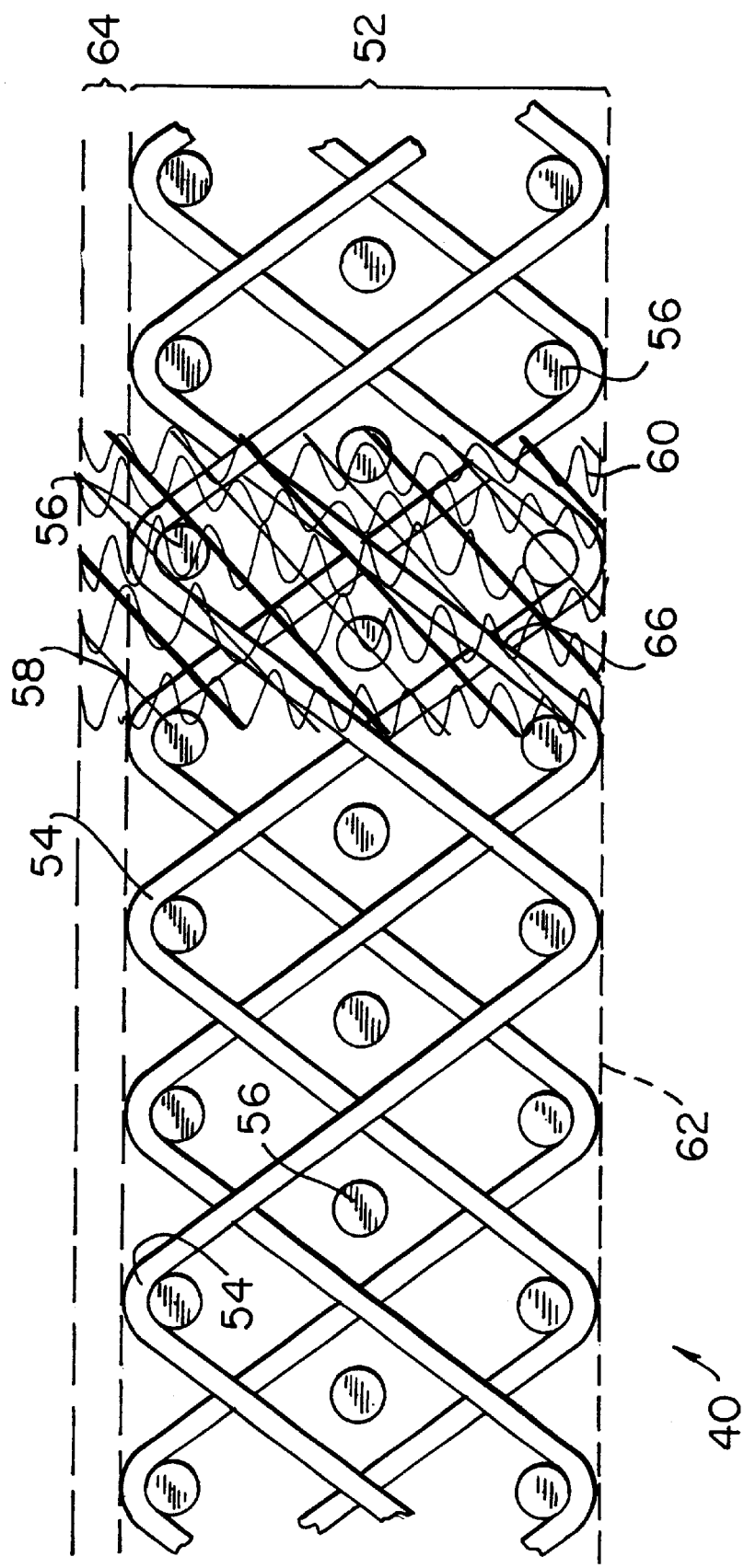
FIG. 2 is a cross-sectional view of the single-facer belt of the present invention.

FIG. 2 is a cross-sectional view, taken in a direction transverse to the running, or machine, direction, of the improved belt 40 of the present invention. The belt 40, as illustrated, has a base structure 52 which is woven endless in a 2½-layer weave, wherein the warp yarns 54 extend in the transverse, or cross-machine, direction of the endless belt 40, and the weft yarns 56 extend in the running, or machine, direction. As a consequence of having been woven endless, base structure 52 lacks a seam, and is therefor not subject to seam failure, a common shortcoming in the single-facer belts of the prior art.

In general, the base structure 52 may have from one to three layers of weft yarns 56, and may be woven in a pattern like that illustrated in FIG. 2, that is, in a weave giving the surfaces of the belt the appearance of a plain weave. Alternatively, the base structure 52, instead of being woven, may be assembled on a mandrel. Such a nonwoven base structure 52 may comprise several layers of yarns oriented in the machine and cross-machine directions and joined to one another by some means, such as a polymeric resin material, at their crossing points. The machine-direction yarns of such a structure would be wound around the mandrel; the cross-machine-direction yarns would be laid crosswise upon previously wound machine-direction yarns. Additional layers of yarns could be built up in a similar manner. Once these yarns were adequately joined to one another at their crossing points, the nonwoven base structure 52 so assembled would be removed from the mandrel for further processing.

In any event, the base structure 52 of the single-facer belt 40 of the present invention is typically on the order of 0.12 inch thick, much thicker than the single-facer belts of the prior art. The unlaminated nature of the base structure 52, along with its increased thickness, avoids the delamination and tracking problems which plague the belts of the prior art.

The base structure 52 may be woven, or otherwise assembled, from warp yarns 54 and weft yarns 56 comprising yarns of any of the varieties used in the manufacture of paper machine clothing and industrial process fabrics. That is to say, the base structure 52 may include monofilament, plied monofilament, multifilament, plied multifilament or yarns spun from staple fibers of any of the synthetic polymeric resins used by those skilled in the art in the manufacture of fabrics intended for use in high-temperature environments. For example, the base structure 42 may be manufactured from yarns of the following materials: polyaramids, such as NOMEX® and KEVLAR®; polyphenylene sulfide (PPS), which is more commonly known as RYTON®; an aromatic polyester, which is commonly known as VECTRAN; polyetheretherketone (PEEK); polyester and blends thereof.

For example, the base structure 52 may comprise yarns of KEVLAR® in the machine direction and RYTON® or polyester monofilament yarns in the cross-machine direction.

Bearing in mind that the base structure 52 is endless, it has an inside and an outside, which are the inner and outer surfaces, respectively, of the endless loop formed by the base structure 52. The outside, or outer surface, 58 of the base structure 52 is needled with a web 60 of staple fiber material in such a manner that some of the fibers are driven into the base structure 52. One or more layers of staple fiber material may be needled into the outside 58 of the base structure 52, and the web 60 may extend partially or completely therethrough. The web 60 of staple fiber material also forms a layer 64 covering the outside 58 of the base structure 52. In addition, one or more layers of staple fiber material may also be needled into the inside, or inner surface, 62 of the base structure 52. For the sake of clarity, the web 60 is included in only a portion of FIG. 2.

The needling provides the present single-facer belt 40 with a fiber-reinforced, protective and cushioning layer on the outside 58, and perhaps also on the inside 62, of the base structure 52. The result is a belt 40 which is much less rigid than those of the prior art.

The staple fiber material needled into the base structure 52 is also of any of the synthetic polymeric resins used by those skilled in the art in the manufacture of fabrics intended for use in high-temperature environments. For example, the staple fiber material may comprise staple fibers of any of the following materials: polyaramids, such as NOMEX® and KEVLAR®; polyphenylene sulfide (PPS), which is more commonly known as RYTON®; polyetheretherketone (PEEK); polyester; polyamides and modified polyamides; and blends thereof. By a modified polyamide is meant a polyamide material which has been subjected to a treatment with an aqueous solution of aldehyde in the presence of a catalyst to effect partial cross-linking of the polyamide to provide a gel content thereof within the range of 0.1 to 75% accompanied by a reduction in crystallinity in the range of 1 to 65% compared with the uncrosslinked material, as disclosed and claimed in commonly assigned U.S. Pat. No. 5,316,833 to Davis et al., the teachings of which are incorporated herein by reference.

The denier of staple fibers making up the web 60 is preferably in the range from 1.5 to 40. The areal density of the web 60 applied to the base structure 52 is preferably in the range from 3.0 to 30.0 oz/yd$^2$.

The integrity and durability of the present single-facer belt 40 is improved by coating and impregnating the base structure 52 with a polymeric resin material 66. Complete impregnation of the needled base structure 52 is preferred rather than a distinct layer on the outside 58 of the base structure. Coating materials include polyurethane, silicone, amide-imides, and fluoropolymers, such as polytetrafluoroethylene (PTFE), which is commonly known as TEFLON®.

Other coating enhancers or fillers may be included in the coating and impregnating material to improve fabric abrasion resistance and/or to alter release properties, such as soil release properties. Examples are silicone, if not already included, clay particles, and PTFE particles.

The coating is preferably applied to the needled base structure 52 in an areal density in the range from 1.0 to 15.0 oz/ft$^2$.

The present single-facer belt 40 is both more compliant and more compressible than the prior-art belt shown in European Publication No. 0 630 739 A1, which was discussed above. A diagonal stress-strain test has been developed at Albany International Corp. and standard procedures have been written for the test. Under the test, typical ultra-rigid fabrics distort less than 2% when a "4 inch by 4 inch" sample is held in an Instron and a 50-lb. force is applied. The prior-art belt has a rigidity (2.023%) just outside this range. This is believed to be one of the reasons for the poor guidability of that belt. By way of contrast, the present single-facer belt has a rigidity in the range from 5% to 10%. The needled base structure 52 allows for the construction of far less rigid belts 40 while satisfying other demands of the belt in operation.

Standard compressibility tests have also been developed at Albany International. Under these tests, the amount of Z-direction deformation of the fabric is measured when a controlled force is applied in that direction, or perpendicular to the direction of travel in operation and perpendicular to the widthwise dimension of the belt. The prior-art belt is extremely incompressible and tests 5%. The present single-facer belt ranges in compressibility from 7% to 25%. It is believed that the compressibility level can be predetermined by varying the amount of fiber needled into the base structure; the amount of needle energy used during this process, needle energy being a function of the depth to which the needles penetrate the base structure and the number of penetrations per unit area; and the coatings applied after the needling process. The compressibility range of the present belt provides a proper nip on the single-facer portion of a corrugating machine and a single-facer belt that is easy to operate.

EXAMPLE

A belt of the present invention was assembled from an endlessly woven base structure having a ½%-layer weave. KEVLAR® yarns were used in the machine direction, and NOMEX® yarns were used in the cross-machine direction. The base structure was needled with a web of 5.5 denier NOMEX® fiber material. The areal density of the web was uniform and in the range from 9.0 to 12.0 oz/yd$^2$. Following needling, the needled surface was flame-singed to remove loose fibers and to make the surface more compact. The needled base structure was finally saturated and impregnated with silicone. The resulting belt operated with excellent results on the single-facer section of a corrugated board production line.

Modifications to the above would be obvious to those of ordinary skill in the art, but would not bring the invention so modified beyond the scope of the appended claims.

What is claimed is:

1. In a single-facer section of a corrugated board production line, said single-facer section being of the variety in which a belt is trained around at least two spaced rollers and forms an extended nip with a roll having uniformly spaced, peripheral teeth by running thereagainst, the improvement comprising an unlaminated single-facer belt, said unlaminated single-facer belt having:

a single base structure, said base structure being in the form of an endless loop lacking a seam and having an inside and an outside, a machine, or running, direction and a cross-machine direction; said base structure being formed by machine-direction and cross-machine-direction yarns;

at least one layer of staple fiber material needled into said outside of said base structure and extending at least partly therethrough;

said base structure and said staple fiber material being impregnated with a polymeric resin material, said yarns of said base structure, said staple fiber material and said polymeric resin material being of high-temperature-resistant materials.

2. The improvement as claimed in claim 1 wherein said base structure is woven from said machine-direction and cross-machine-direction yarns.

3. The improvement as claimed in claim 2 wherein said base structure has from one to three layers of machine-direction yarns.

4. The improvement as claimed in claim 1 wherein said base structure is an unwoven structure, said machine-direction and cross-machine-direction yarns being joined at points where they cross one another.

5. The improvement as claimed in claim 4 wherein said base structure has at least two layers of machine-direction yarns.

6. The improvement as claimed in claim 1 wherein said machine-direction and cross-machine-direction yarns are selected from the group consisting of monofilament, plied monofilament, multifilament, plied multifilament and spun yarns.

7. The improvement as claimed in claim 1 wherein said machine-direction and cross-machine-direction yarns are of a high-temperature-resistant synthetic polymeric resin selected from the group consisting of polyaramids, polyphenylene sulfide (PPS), aromatic polyesters, polyetheretherketone (PEEK), modified polyamides, polyesters and blends thereof.

8. The improvement as claimed in claim 1 wherein said staple fiber material is a high-temperature-resistant synthetic polymeric resin selected from the group consisting of polyaramids, polyphenylene sulfide (PPS), polyetheretherketone (PEEK), polyesters, polyamides and modified polyamides, and blends thereof.

9. The improvement as claimed in claim 1 wherein said staple fiber material comprises fibers having a denier in the range from 1.5 to 40.

10. The improvement as claimed in claim 1 wherein said polymeric resin material impregnating said base structure and said staple fiber material is selected from the group consisting of polyurethane, silicone, amide-imide, and fluoropolymers.

11. The improvement as claimed in claim 1 wherein said polymeric resin material impregnating said base structure and said staple fiber material further comprises at least one of silicone, clay particles and PTFE particles as a coating enhancer or filler.

12. In a single-facer section of a corrugated board production line, said single-facer section being of the variety in which a belt is trained around at least two spaced rollers and forms an extended nip with a roll having uniformly spaced, peripheral teeth by running thereagainst, the improvement comprising an unlaminated single-facer belt, said unlaminated single-facer belt having:

a single base structure, said base structure being in the form of an endless loop lacking a seam and having an inside and an outside, a machine, or running, direction and a cross-machine direction; said base structure being formed by machine-direction and cross-machine-direction yarns;

at least one layer of staple fiber material needled into said outside of said base structure and extending at least partly therethrough;

at least one layer of staple fiber material needled into said inside of said base structure;

said base structure and said staple fiber material being impregnated with a polymeric resin material; and said yarns of said base structure, said staple fiber material and said polymeric resin material being of high-temperature-resistant materials.

13. The improvement as claimed in claim 12 wherein said staple fiber material is a high-temperature-resist synthetic polymeric resin selected from the group consisting of polyaramids, polyphenylene sulfide (PPS), polyetheretherketone (PEEK), polyesters, polyamides and modified polyamides, and blends thereof.

14. The improvement as claimed in claim 12 wherein said staple fiber material comprises fibers having a denier in the range from 1.5 to 40.

15. The improvement as claimed in claim 12 wherein the areal density of said staple fiber material relative to said base structure. is in the range from 3.0 to 30.0 oz/yd$^2$.

16. In a single-facer section of a corrugated board production line, said single-facer section being of the variety in which a belt is trained around at least two spaced roller and forms an extended nip with a roll having uniformly spaced, peripheral teeth by running thereagainst, the improvement comprising an unlaminated single-facer belt, said unlaminated single-facer belt having:
   a single base structure, said base structure being in the form of an endless loop lacking a seam and having an inside and an outside, a machine, or running, direction and a cross-machine direction; said base structure being formed by machine-direction and cross-machine-direction yams;
   at least one layer of staple fiber material needled into said outside of said base structure and extending at least partly therethrough wherein said staple fiber material has an areal density relative to said base structure in the range from 3.0 to 30.0 oz/yd$^2$;
   said base structure and said staple fiber material being impregnated with a polymeric resin material; and
   said yarns of said base structure, said staple fiber material and said polymeric resin material being of high-temperature-resistant materials.

17. In a single-facer section of a corrugated board production line, said single-facer section being of the variety in which a belt is trained around at least two spaced rollers and forms an extended nip with a roll having uniformly spaced, peripheral teeth by running thereagainst, the improvement comprising an unlaminated single-facer belt, said unlaminated single-facer belt having:
   a single base structure, said base structure being in the form of an endless loop lacking a seam and having an inside and an outside, a machine, or running, direction and a cross-machine direction; said base structure being formed by machine-direction and cross-machine-direction yarns;
   at least one layer of staple fiber material needled into said outside of said base structure and extending at least partly therethrough;
   said base structure and said staple fiber material being impregnated with a polymeric resin material wherein said polymeric resin material has an areal density relative to said base structure in the range from 1.0 to 15.0 oz/ft$^2$; and
   said yarns of said base structure, said staple fiber material and said polymeric resin material being of high-temperature-resistant materials.

18. In a single-facer section of a corrugated board production line, said single-facer section being of the variety in which a belt is trained around at least two spaced rollers and forms an extended nip with a roll having uniformly spaced, peripheral teeth by running thereagainst, the improvement comprising an unlaminated single-facer belt, said unlaminated single-facer belt having:
   a single base structure, said base structure being in the form of an endless loop lacking a seam and having an inside and an outside, a machine, or running, direction and a cross-machine-direction; said base structure being formed by machine-direction and cross-machine direction yarns;
   at least one layer of staple fiber material needled into said outside of said base structure and extending at least partly therethrough;
   said base structure an said staple fiber material being impregnated with a polymeric resin material;
   said yarns of said base structure, said staple fiber material and said polymeric resin material being of high-temperature-resistant materials; and
   wherein said unlaminated single-facer belt has a rigidity in the range from 5% to 10%.

19. In a single-facer section of a corrugated board production line, said single-facer section being of the variety in which a belt is trained around at least two spaced rollers and forms an extended nip with a roll having uniformly spaced, peripheral teeth by running thereagainst, the improvement comprising an unlaminated single-facer belt, said unlaminated single-facer belt having:
   a single base structure, said base structure being in the form of an endless loop lacking a seam and having an inside and an outside, a machine, or running, direction and a cross-machine direction; said base structure being formed by machine-direction; said base structure being formed by machine-direction and cross-machine-direction yarns;
   at least one layer of staple fiber material needled into said outside of said base structure and extending at least partly therethrough;
   said base structure and said staple fiber material being impregnated with a polymeric resin material; and
   said yarns of said base structure, said staple fiber material and said polymeric resin material being of high-temperature-resistant materials wherein said unlaminated single-facer belt has a Z-direction compressibility in the range from 7% to 25%.

* * * * *